March 29, 1966   C. H. GUBBINS   3,242,998
ELECTRICALLY DRIVEN EQUIPMENT
Filed May 23, 1963
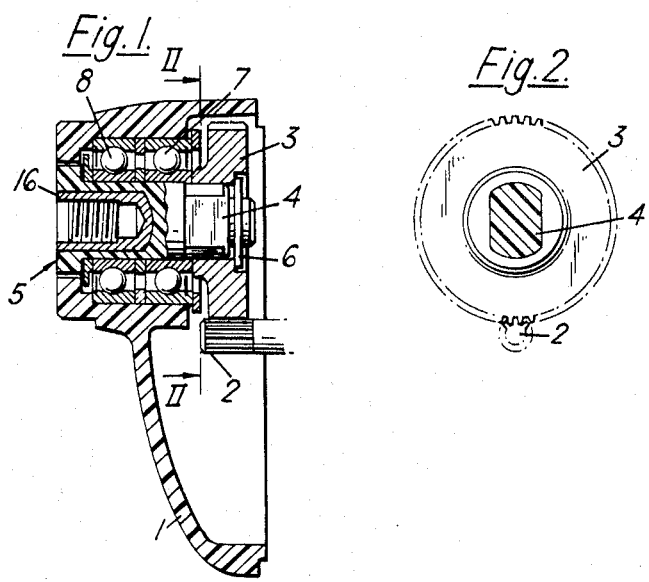
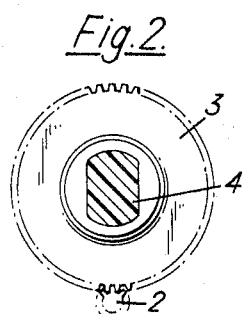
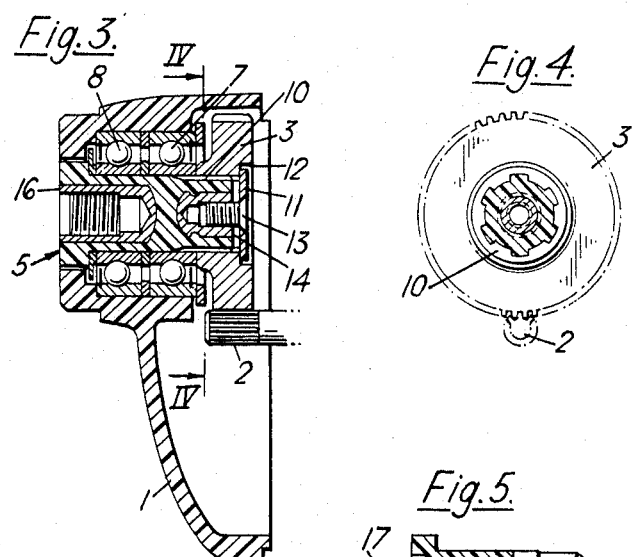
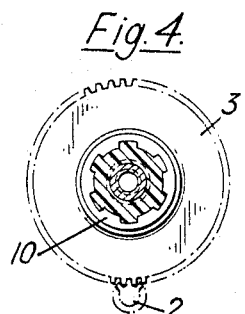
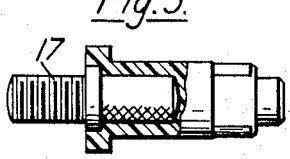
Inventor
Charles H. Gubbins
By Kenon Palmer,
Stewart & Estabrook
Attorneys

United States Patent Office 3,242,998
Patented Mar. 29, 1966

3,242,998
ELECTRICALLY DRIVEN EQUIPMENT
Charles Henry Gubbins, London, England, assignor to Wolf Electric Tools Limited, London, England, a British company
Filed May 23, 1963, Ser. No. 282,802
Claims priority, application Great Britain, May 28, 1962, 20,446/62
2 Claims. (Cl. 173—163)

This invention relates to electrically powered apparatus from which the power output is taken by way of a rotating spindle connected at one end to the drive, and designed for connection to the member to be driven (i.e. the working member) at its other end. Examples of such apparatus are electric drills, in which the member to be driven is the chuck, and rotary polishers.

According to the present invention electrically powered apparatus including an electric motor connected to drive a rotatable spindle having means for fixing a working member to it has a casing of insulating material, and the spindle is also formed of insulating material. It will be seen that in this apparatus all the exposed parts are fully insulated even though a rotary output is taken from the apparatus. To insulate previous equipment of this type it has been necessary to make a number of separate insulated connections within the equipment, and even with these connections it has proved difficult to effect adequate insulation where the rotary output is led through the casing of the apparatus. Apparatus according to the invention does not need internal insulating connections, and the method of insulation is much simpler. Furthermore apparatus insulated in this way is safer than that insulated internally since the problem of effectively insulating the rotary spindle is solved much more satisfactorily.

For low torque applications it has been found that the working member can be fixed directly to the spindle, but preferably the spindle has a metal insert moulded in situ in the insulating material, the insert having a threaded part for receiving a similarly threaded part as the member. This enables production of the spindle to be effected very cheaply and easily, and allows a good drive transmission from the spindle to the working member.

Examples of apparatus according to the invention will now be described in more detail with reference to the accompanying drawings in which:

FIGURE 1 is a part section part side elevation through part of one form of apparatus;
FIGURE 2 is a section on the line II—II of FIGURE 1;
FIGURE 3 is a section of part of a second form of the apparatus;
FIGURE 4 is a section on the line IV—IV of FIGURE 3; and
FIGURE 5 is a part-section through an alternative form of spindle.

FIGURE 1 shows one end of the casing 1 of an electrically powered apparatus driven by an electric motor (not shown) by way of a pinion 2 on the output shaft of the motor. The pinion meshes with a gear wheel 3 which is fitted over the end 4 of a spindle shown generally as 5. The end 4 is of non-circular cross-section so that the gear wheel and spindle are held to rotate together. The gear wheel is held in position axially on the spindle by a spring clip 6 of the non-return type which can be forced onto the end of the spindle into contact with the gear wheel, but has parts engaging the spindle to prevent the clip being removed. This spring clip bears against one side of the gear wheel, and the other side of the gear wheel bears against the inner race of a bearing 7. This bearing 7 together with a further bearing 8 mount the spindle for rotation within the casing 1. The end of the spindle removed from the gear wheel has an internally tapped metal insert 16 positioned in it for receiving a working member. For example if the apparatus is an electric drill this insert would receive the threaded boss of the chuck. In other appplications it could receive threaded bosses on the ends of such things as polishing pads, sanding pads or in fact any working member needing a rotary drive.

The casing 1 of the apparatus is made from insulating material, and the spindle is also formed from insulating material, a suitable material for the spindle being glass filled nylon. Both the casing and the spindle are moulded, and in the case of the spindle the metal insert 16 is moulded in situ.

In the alternative construction shown in FIGURES 3 and 4 the apparatus is similar and parts identical to those of the apparatus of FIGURE 1 are denoted by the same reference number. This apparatus differs in the mode of attachment of the gear wheel 3 to the spindle 5, and in this case the end of the spindle that receives the gear wheel is splined as shown at 10 and the gear wheel fitted onto the splines. In this case the gear wheel is held axially against the inner race of the bearing 7 by a plate 11 which is held against a shoulder 12 formed round the inner surface of the pinion by a screw 13 received in an internally tapped metal insert 14 in the end of the spindle. The metal insert 16 at the other end of the spindle is the same as that shown in FIGURE 1, but in fact this insert may be of any suitable form for receiving the required working member.

Once again both the casing and the spindle are moulded from insulating material, and in this case both metal inserts 14 and 16 are moulded in situ in the material of the spindle.

The spindle shown in either of these figures may be replaced by that shown in FIGURE 5 if desired. This differs in that it has an externally threaded boss 17 projecting from the insert rather than the tapped bore within the insert.

It will be seen from the drawings that all the exposed parts except the metal inserts 16 are of insulating material, and even the metal insert 16 is embedded in insulating material and cannot be in any electrical contact with any internal part of the apparatus. This arrangement means that all the exposed parts are fully insulated.

I claim:
1. In combination with an electric motor driven power tool having an insulating housing, mechanical power output means comprising a spindle formed of insulating material and having a blind bore at the outer end thereof, said spindle being rotatably mounted in and enclosed by said insulating housing to be driven by said motor, and having means within said blind bore for attaching a working tool thereto.
2. The combination as defined by claim 1 which further includes a gear rigidly attached to said spindle at its innermost end for engaging a mating gear driven by said motor.

References Cited by the Examiner
UNITED STATES PATENTS

| 1,189,184 | 6/1916 | Whiteside | 310—43 |
| 1,960,470 | 5/1934 | Whiteside | 310—43 |
| 2,237,999 | 4/1941 | Newman | 310—50 |
| 3,121,813 | 2/1964 | Pratt et al. | 310—50 |

WILLIAM W. DYER, Jr., *Primary Examiner.*
FRANCIS S. HUSAR, *Examiner.*